(12) United States Patent
Capodieci

(10) Patent No.: US 7,141,259 B2
(45) Date of Patent: *Nov. 28, 2006

(54) ULTRASONICALLY ACTIVATED CONTINUOUS SLITTER APPARATUS AND METHOD

(75) Inventor: Roberto A. Capodieci, Glen Ellyn, IL (US)

(73) Assignee: Mars, Incorporated, McLean, VA (US)

( * ) Notice: Subject to any disclaimer, the term of this patent is extended or adjusted under 35 U.S.C. 154(b) by 1010 days.

This patent is subject to a terminal disclaimer.

(21) Appl. No.: 10/001,494

(22) Filed: Oct. 31, 2001

(65) Prior Publication Data

US 2002/0119225 A1 Aug. 29, 2002

Related U.S. Application Data

(63) Continuation of application No. 09/581,982, filed on Aug. 24, 2000, now Pat. No. 6,368,647, which is a continuation of application No. PCT/US98/27740, filed on Dec. 29, 1998.

(51) Int. Cl.
*A23L 1/00* (2006.01)
*A23P 1/00* (2006.01)
*B23D 25/04* (2006.01)

(52) U.S. Cl. .................. 426/238; 426/518; 426/660; 83/318; 83/325; 83/407

(58) Field of Classification Search ............... 426/238, 426/518, 660; 99/451; 83/318, 325, 407
See application file for complete search history.

(56) References Cited

U.S. PATENT DOCUMENTS

| D55,542 S | 6/1920 | Wipf |
|---|---|---|
| 2,145,941 A | 2/1939 | Maxfield |
| D117,043 S | 6/1939 | Huber |
| 3,029,751 A | 4/1962 | Gilmore |
| 3,031,804 A | 5/1962 | Thatcher et al. |
| 3,044,510 A | 7/1962 | Schneider et al. |
| 3,114,643 A | 12/1963 | Boston et al. |
| 3,199,437 A | 8/1965 | Nelsen |
| D212,542 S | 10/1968 | McCarthy |
| 3,407,077 A | 10/1968 | Helin |
| 3,416,398 A | 12/1968 | Bodine |
| RE26,543 E | 3/1969 | Beeson et al. |
| 3,434,906 A | 3/1969 | De Greeve et al. |
| 3,505,136 A | 4/1970 | Attwood |
| 3,615,712 A | 10/1971 | Keller |
| 3,636,859 A | 1/1972 | Null |
| 3,819,089 A | 6/1974 | Scales |
| 3,829,007 A | 8/1974 | Ellison |
| 3,830,944 A | 8/1974 | Dimitriadis et al. |
| 3,873,735 A | 3/1975 | Chalin et al. |
| 3,895,118 A | 7/1975 | Rambold |
| 3,961,089 A | 6/1976 | Dogliotti |
| 3,971,838 A | 7/1976 | Yazawa |

(Continued)

FOREIGN PATENT DOCUMENTS

AT 382 112 B 1/1987

(Continued)

*Primary Examiner*—N. Bhat
(74) *Attorney, Agent, or Firm*—McAndrews, Held & Malloy

(57) ABSTRACT

An apparatus (30) and method for ultrasonically energized slitting of a slab of confectionary material wherein a slitting tool (33a) incorporates a plurality of slitting knives (37a) spaced apart in accordance with the desired width of the product, which strips are further processed by transverse cutting and/or molding or other processing steps such as chocolate enrobing to provide improved confectionary products.

23 Claims, 5 Drawing Sheets

U.S. PATENT DOCUMENTS

| | | | |
|---|---|---|---|
| 4,017,237 | A | 4/1977 | Webster |
| 4,055,109 | A | 10/1977 | Kan |
| 4,097,327 | A | 6/1978 | Calemard |
| 4,115,489 | A | 9/1978 | Macfee |
| 4,163,768 | A | 8/1979 | Stephens |
| D254,936 | S | 5/1980 | Saunders |
| 4,216,639 | A | 8/1980 | Gautier |
| 4,290,521 | A | 9/1981 | Mitchell |
| 4,358,466 | A | 11/1982 | Stevenson |
| 4,361,235 | A | 11/1982 | Gautier |
| 4,373,982 | A | 2/1983 | Kreager et al. |
| 4,394,395 | A | 7/1983 | Rostagno et al. |
| 4,421,773 | A | 12/1983 | Akutagawa |
| 4,453,370 | A | 6/1984 | Titchenal |
| 4,500,280 | A | 2/1985 | Astier et al. |
| 4,514,426 | A | 4/1985 | Jordan et al. |
| 4,517,790 | A | 5/1985 | Kreager |
| 4,521,467 | A | 6/1985 | Berger |
| 4,534,726 | A | 8/1985 | Simelunas |
| 4,534,818 | A | 8/1985 | Kreager et al. |
| 4,574,566 | A | 3/1986 | Eaves et al. |
| 4,601,157 | A | 7/1986 | Adelman |
| 4,605,123 | A | 8/1986 | Goodrum et al. |
| 4,608,261 | A | 8/1986 | MacKenzie |
| 4,616,470 | A | 10/1986 | Nakamura |
| 4,631,901 | A | 12/1986 | Chung et al. |
| 4,651,870 | A | 3/1987 | Giambalvo |
| 4,652,456 | A | 3/1987 | Sailsbury |
| 4,663,915 | A | 5/1987 | Van Erden et al. |
| 4,663,917 | A | 5/1987 | Taylor et al. |
| 4,685,602 | A | 8/1987 | Hama |
| 4,693,056 | A | 9/1987 | Raszewski |
| 4,735,753 | A | 4/1988 | Ackermann |
| D296,377 | S | 6/1988 | Skiver et al. |
| 4,751,916 | A | 6/1988 | Bory |
| 4,759,170 | A | 7/1988 | Sawa et al. |
| 4,759,249 | A | 7/1988 | Held |
| 4,774,797 | A | 10/1988 | Colamussi et al. |
| 4,784,591 | A | 11/1988 | Ackermann |
| 4,787,755 | A | 11/1988 | Branson |
| 4,796,300 | A | 1/1989 | Branson |
| 4,810,109 | A | 3/1989 | Castel |
| 4,849,233 | A | 7/1989 | Hemker |
| 4,864,802 | A | 9/1989 | D'Angelo |
| 4,865,680 | A | 9/1989 | Pierson |
| 4,879,124 | A | 11/1989 | Oberle |
| 4,890,439 | A | 1/1990 | Smart et al. |
| 4,909,870 | A | 3/1990 | Gould et al. |
| 4,923,701 | A | 5/1990 | VanErden |
| 4,937,410 | A | 6/1990 | Anderson |
| 4,950,859 | A | 8/1990 | Anderson |
| 4,972,995 | A | 11/1990 | Schara et al. |
| 5,044,777 | A | 9/1991 | Watkins et al. |
| 5,058,364 | A | 10/1991 | Seiden et al. |
| 5,061,331 | A | 10/1991 | Gute |
| 5,067,302 | A | 11/1991 | Boeckmann |
| 5,104,674 | A | 4/1992 | Chen et al. |
| 5,161,350 | A | 11/1992 | Nakamura |
| 5,181,365 | A | 1/1993 | Garvey et al. |
| 5,202,064 | A | 4/1993 | Furusawa et al. |
| 5,222,813 | A | 6/1993 | Kopp et al. |
| 5,226,343 | A | 7/1993 | Rawson et al. |
| 5,228,372 | A | 7/1993 | Harrop et al. |
| 5,230,761 | A | 7/1993 | Crawford |
| 5,257,510 | A | 11/1993 | Cox |
| 5,280,844 | A | 1/1994 | Kaufman et al. |
| 5,342,634 | A | 8/1994 | Murata et al. |
| 5,366,741 | A | 11/1994 | Van Der Zon |
| 5,391,387 | A | 2/1995 | Peters |
| 5,419,437 | A | 5/1995 | Huseman |
| 5,435,712 | A | 7/1995 | Probst |
| 5,437,215 | A | 8/1995 | Hamilton |
| 5,519,982 | A | 5/1996 | Herber et al. |
| 5,525,363 | A | 6/1996 | Herber et al. |
| 5,552,165 | A | 9/1996 | Haak et al. |
| 5,582,853 | A | 12/1996 | Marnocha et al. |
| 5,645,681 | A | 7/1997 | Gopalakrishna et al. |
| 5,667,824 | A | 9/1997 | Ream et al. |
| 5,689,942 | A | 11/1997 | Suga |
| 5,694,745 | A | 12/1997 | Spatafora et al. |
| 5,706,635 | A | 1/1998 | Simmons |
| 5,733,587 | A | 3/1998 | Ream et al. |
| 5,752,423 | A | 5/1998 | Rawson |
| 5,819,615 | A | 10/1998 | Dale et al. |
| 5,827,559 | A | 10/1998 | Powell |
| 5,846,584 | A | 12/1998 | Capodieci |
| 5,861,185 | A | 1/1999 | Capodieci |
| 5,863,585 | A | 1/1999 | Sjö berg |
| 5,871,783 | A | 2/1999 | Capodieci |
| 5,871,793 | A | 2/1999 | Capodieci |
| 5,914,142 | A | 6/1999 | Zartner |
| 5,928,695 | A | 7/1999 | Capodieci |
| 6,032,561 | A | 3/2000 | Lonn et al. |
| D422,774 | S | 4/2000 | Hersh |
| 6,068,868 | A | 5/2000 | Capodieci |
| 6,070,509 | A | 6/2000 | Lonn et al. |
| 6,143,336 | A | 11/2000 | Capodieci |
| 6,210,728 | B1 | 4/2001 | Capodieci |
| 6,231,330 | B1 | 5/2001 | Capodieci |
| 6,231,913 | B1 | 5/2001 | Schwimer et al. |
| 6,318,248 | B1 | 11/2001 | Capodieci |
| 6,357,914 | B1 | 3/2002 | Kinigakis et al. |
| 6,361,609 | B1 | 3/2002 | Ouellette et al. |
| 6,368,647 | B1 | 4/2002 | Capodieci |
| 6,403,132 | B1 | 6/2002 | Capodieci |
| 6,403,138 | B1 | 6/2002 | Arora |
| 6,431,849 | B1 | 8/2002 | Capodieci |
| 6,477,820 | B1 | 11/2002 | Dutra et al. |
| 6,517,879 | B1 | 2/2003 | Capodieci |
| 6,554,931 | B1 | 4/2003 | Blanchard et al. |
| 6,574,944 | B1 | 6/2003 | Capodieci |
| 2002/0119225 | A1 | 8/2002 | Capodieci |
| 2003/0003207 | A1 | 1/2003 | Capodieci |

FOREIGN PATENT DOCUMENTS

| | | |
|---|---|---|
| AU | 733163 | 11/1998 |
| CA | 14902 | 1/1946 |
| CA | 41222 | 10/1976 |
| CA | 75746 | 2/1995 |
| CA | 79905 | 2/1997 |
| DE | 29 22 834 A1 | 12/1980 |
| DE | 30 34 955 A1 | 3/1982 |
| DE | 35 29 686 A | 2/1987 |
| DE | 88 09 048 | 10/1988 |
| DE | 40 17 363 A1 | 12/1991 |
| DE | 195 05 298 A1 | 8/1996 |
| DE | 197 16 141 A1 | 10/1997 |
| EP | 0 084 903 A2 | 8/1983 |
| EP | 0 333 390 A2 | 9/1989 |
| EP | 0 478 812 A1 | 4/1992 |
| EP | 0 584 670 | 3/1994 |
| EP | 0 499 647 B1 | 1/1995 |
| EP | 0 561 654 B1 | 1/1996 |
| EP | 0 733 409 A | 9/1996 |
| EP | 0 813 937 A | 12/1997 |
| FR | 2 620 071 A | 3/1989 |
| FR | 2 665 683 A1 | 2/1992 |
| GB | 672 688 A | 5/1952 |
| GB | 952 581 | 3/1964 |
| GB | 1 013 665 | 12/1965 |
| GB | 2 117 350 A | 10/1983 |
| GB | 2 171 077 A | 8/1986 |
| GB | 2 219 245 A | 12/1989 |

| | | | | | | |
|---|---|---|---|---|---|---|
| GB | 2 276 138 A | 9/1994 | | WO | WO 96/09919 | 4/1996 |
| GB | 2 283 007 A | 4/1995 | | WO | WO 98/48642 | 11/1998 |
| JP | 55-154119 | 12/1980 | | WO | WO 99/33356 | 7/1999 |
| JP | 57-91164 | 6/1982 | | WO | WO 00/20191 | 4/2000 |
| JP | 63-315223 | 12/1988 | | WO | WO 03/020051 | 3/2003 |
| JP | 03-158227 | 7/1991 | | | | |

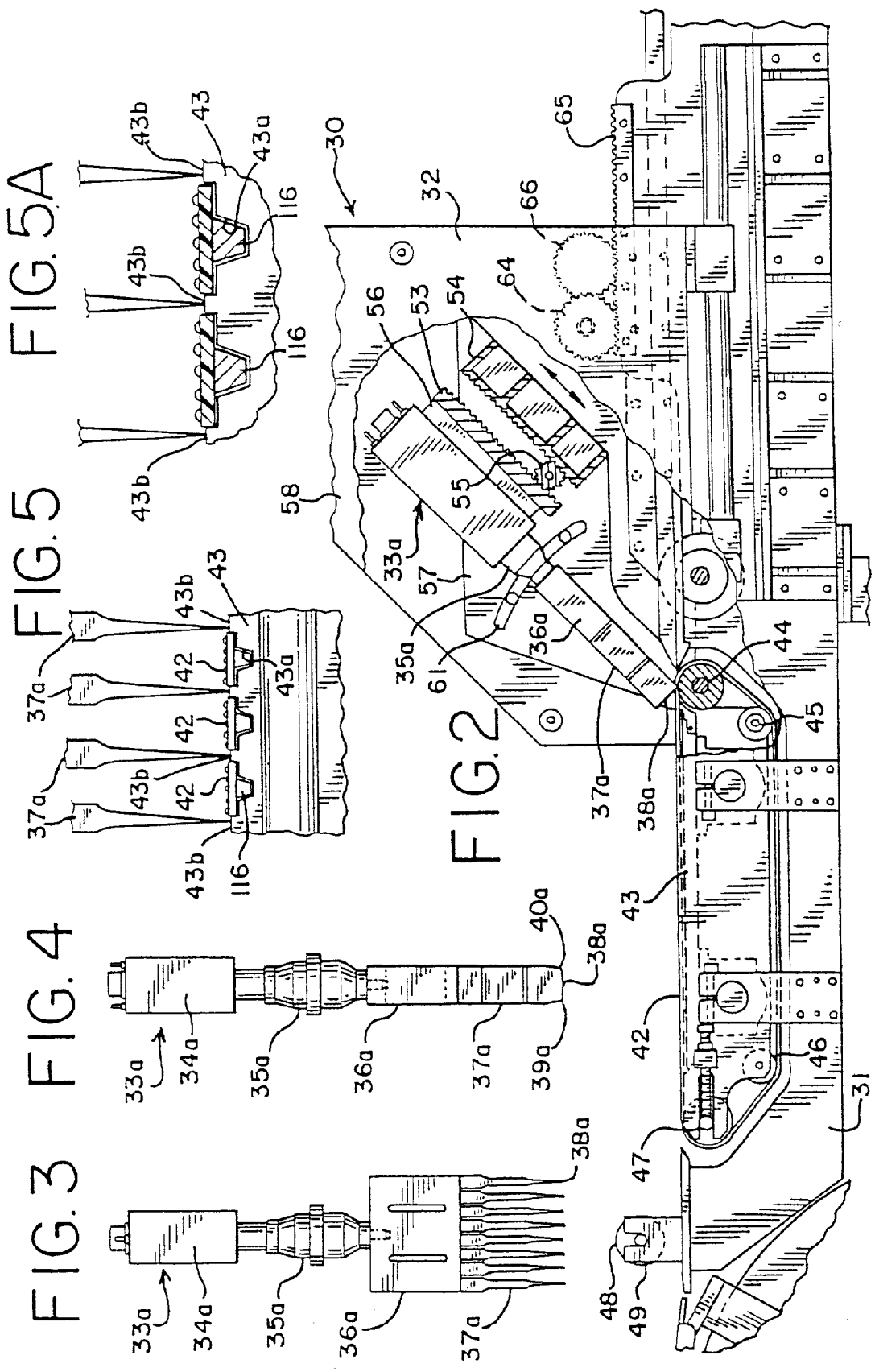

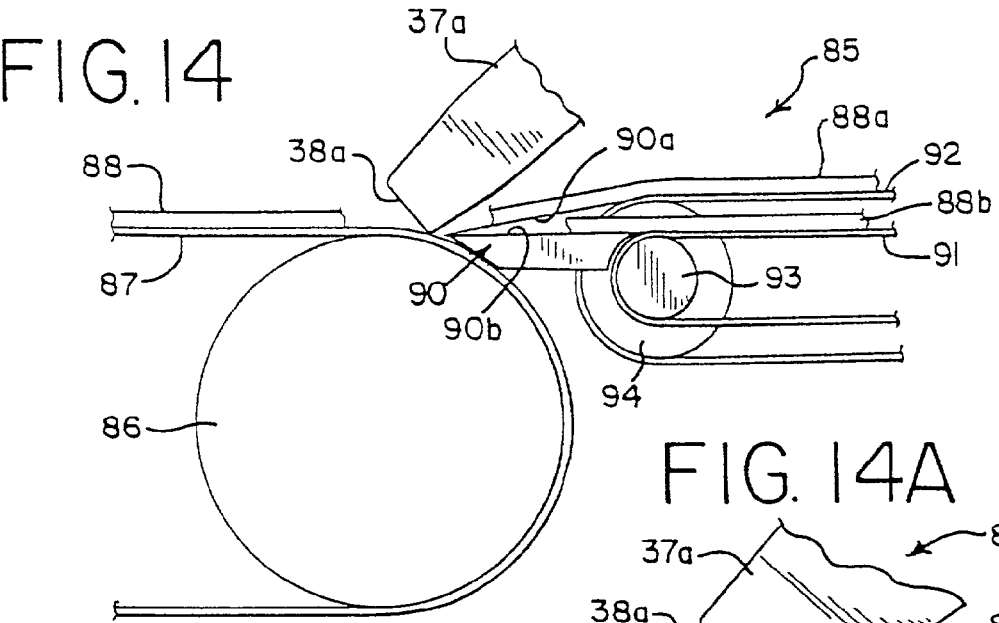
FIG. 14
FIG. 14A
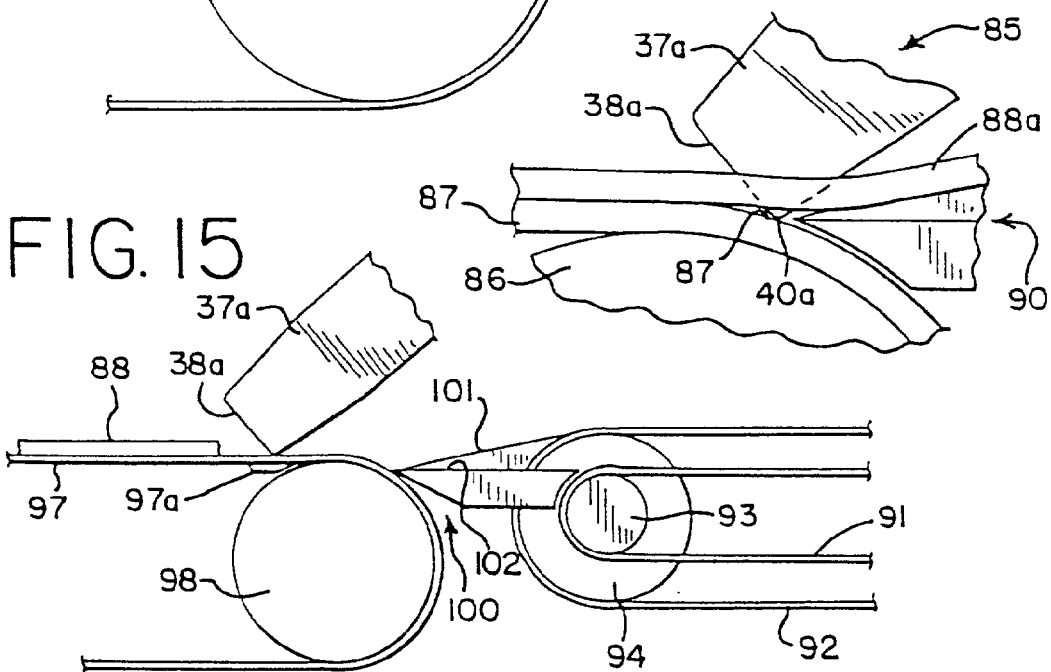
FIG. 15
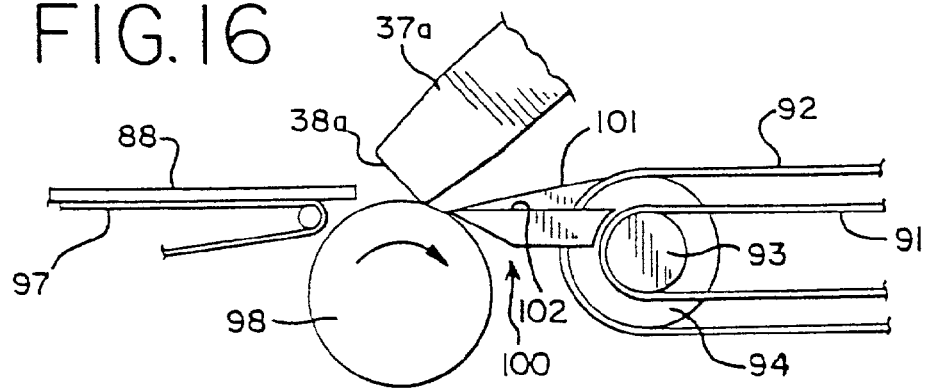
FIG. 16

ULTRASONICALLY ACTIVATED CONTINUOUS SLITTER APPARATUS AND METHOD

This application is a continuation of 09/581,982 filed Aug. 24, 2000 now U.S. Pat. No. 6,368,647 which is a continuation of PCT/US98/27740 filed Dec. 29, 1998.

BACKGROUND OF THE INVENTION

The present invention relates generally to the confectionery processing, and more particularly, to the use of ultrasonically energized apparatus for slitting extended, continuous lengths of confectionery stock.

In one of its more preferred forms, the invention relates to a method and apparatus for longitudinally slitting a continuously moving slab of a composite confectionery product such as, for example, a composite slab having layers of nougat and caramel superimposed to form a wide slab. According to the process, the slab is formed by successively depositing a mass of a first confectionery product component, such as nougat, from a chill roll onto a conveyor, advancing the first confectionery product component formation thus created toward a station adjacent a second chill roll, at which a top layer of a second confectionery product component, such as caramel, is added to form the composite slab. The conveyor continues to advance the slab toward a cutting station at which a properly arranged, suitably adjusted array of ultrasonically energized slitters continuously slit the slab to provide a continuously moving array of spaced apart strips of confectionery product. These strips are subsequently formed into individual confectionery product segments by transverse cutting (ultrasonic or otherwise) and/or molding (ultrasonic or otherwise).

Depending on the intentions of the producer and the intended destination of the product, the cut individual shapes can be enrobed with a coating of chocolate. Thereafter, the individual finished products may be wrapped and boxed for sale and shipment.

An important aspect of the present invention is the design, construction and arrangement of a slitting tool of a desired configuration. Another aspect of the process relates to the manner of positioning the cutting edges of the slitting tool in arrays and the method of advancing the slabs so as to continuously slit the slab into a plurality of product strips.

Recently, it has been discovered that ultrasonically energized forming tools may be utilized to cut individual pieces of confectionery stock by transverse motion, wherein the stock is compressed between a support surface and a descending knife. In addition, ultrasonically energized product forming tools having a cavity shaped in accordance with the configuration of the product to be formed therewith have been found to be effective in simultaneously cutting and shaping an individual piece of confectionery stock from a leading edge of a strip of stock. This again involves compression and reforming of a piece of stock which is substantially captured or surrounded by the active surfaces of the tool.

The concept of slitting a continuous slab into plural strips, however, has presented problems and difficulties which, heretofore, have not been overcome by prior art slitters which commonly are in the form of rotary blades. For example, use of these rotary blade slitters have resulted in the build-up of product (particularly with soft and tacky confectionery products such as nougat and caramel layered slabs) which has necessitated frequent shutdown and washing, resulting in costly downtime. Efforts to solve this product build-up have involved the use of scrapers which require otherwise unnecessary personnel to monitor and remove the scraped product. Other efforts to solve this product build-up have involved the application of lubricants to the rotary blades which impart an undesirable slickness to the product that interferes which further processing such as chocolate enrobing and can produce a product of relatively short shelf life. Also, the performance of rotary blade slitters is particularly sensitive to product formulations and conditions, variations therein from narrow parameters can cause product jams. Additionally, rotary blade slitters can cause crunching of inclusions such as nuts and the like, leaving voids in the slab which, among other things, also interferes with chocolate enrobing. Accordingly, these prior art rotary blade slitter systems used in the production of confectionery products have created excessive scrap, produced reduced product yields and also suffered from related cleanliness or sanitation problems.

The present invention succeeds in overcoming these shortcomings by providing a high quality, effective cutting action having a number of significant advantages and beneficial characteristics, including reliability, low cost operation and high production speeds.

It is, therefore, an object of the present invention to provide an improved apparatus and process for slitting extended, continuous lengths of confectionery stock.

Another object of this invention is to provide an apparatus and process which utilizes an ultrasonically energized slitting tool for forming strips from a slab of confectionery material.

Another object of the present invention is to provide an apparatus and process for rapidly slitting a continuous slab of confectionery material into a plurality of adjacent strips of a desired width utilizing an ultrasonically energized slitting knives which do not suffer from excessive product build-up characteristic of prior art rotary blade slitters.

Another object of the present invention is to provide an apparatus and method which utilize an ultrasonically energized slitting tool for forming a plurality of strips from a slab of confectionery stock which method and apparatus minimize the crunching and fragmentation of inclusions such as nuts and the like and produce product strips which are essentially free of voids.

Another object of the present invention is to provide an apparatus and method of slitting a slab of confectionery stock which accommodate a wide variation in product formulations, enabling such slitting to be efficiently accomplished with highly viscous and/or tacky ingredients such as are associated with lower calorie confectionery products.

Another object of the present invention is to provide an apparatus and method for continuously slitting a slab of confectionery material into a plurality of strips which apparatus and method are more robust in that they provide greater flexibility in processing parameters and product formulations and conditions than are available with conventional rotary blade slitters.

The foregoing and other objects and advantages are achieved by providing an ultrasonically energized slitting tool which contacts a slab of confectionery material wherein slitting tool incorporates a plurality of slitting knives spaced apart in accordance with the desired width of the product steps which strips are further processed by transverse cutting and/or molding and other processing steps such as chocolate enrobing to provide improved confectionery products.

The manner in which the foregoing and other objects and advantages are achieved in practice will become more apparent when reference is made to the following detailed description of the preferred embodiments of the invention set forth by way of example and shown in the accompanying drawings wherein like reference numerals indicate corresponding parts throughout.

BRIEF DESCRIPTION OF THE DRAWINGS

FIG. 2 is a side elevational view with portions broken away of the apparatus of FIG. 1;

FIG. 3 is a front view, partly diagrammatic in nature, showing an ultrasonically energized slitter tool used in the apparatus of FIGS. 1 and 2;

FIG. 4 is a side elevational view of the tool shown in FIG. 3;

FIG. 5 is a fragmentary front view of an array of ultrasonically energized slitter tool blades used in the apparatus of FIGS. 1 and 2;

FIG. 5A is an enlargement of a portion of FIG. 5 illustrating in cross-section the slitter feed belts and underlying support surface of the embodiment of FIGS. 1–5;

FIG. 14 is a fragmentary diagrammatic side view illustrating a portion of an ultrasonically energized slitter tool in operation slitting a slab of confectionery stock in accordance with the present invention;

FIG. 14A is an enlargement of a portion of FIG. 14 illustrating in greater detail the operation of the slitter tool of that embodiment;

FIG. 15 is a fragmentary diagrammatic side view illustrating a portion of an ultrasonically energized slitter tool in operation slitting a slab of confectionery stock in accordance with another embodiment of the present invention;

FIG. 16 is a fragmentary diagrammatic side view illustrating a portion of an ultrasonically energized slitter tool in operation slitting a slab of confectionery stock in accordance with a further embodiment of the present invention.

DESCRIPTION OF THE PREFERRED EMBODIMENTS OF THE INVENTION

Figure 1:
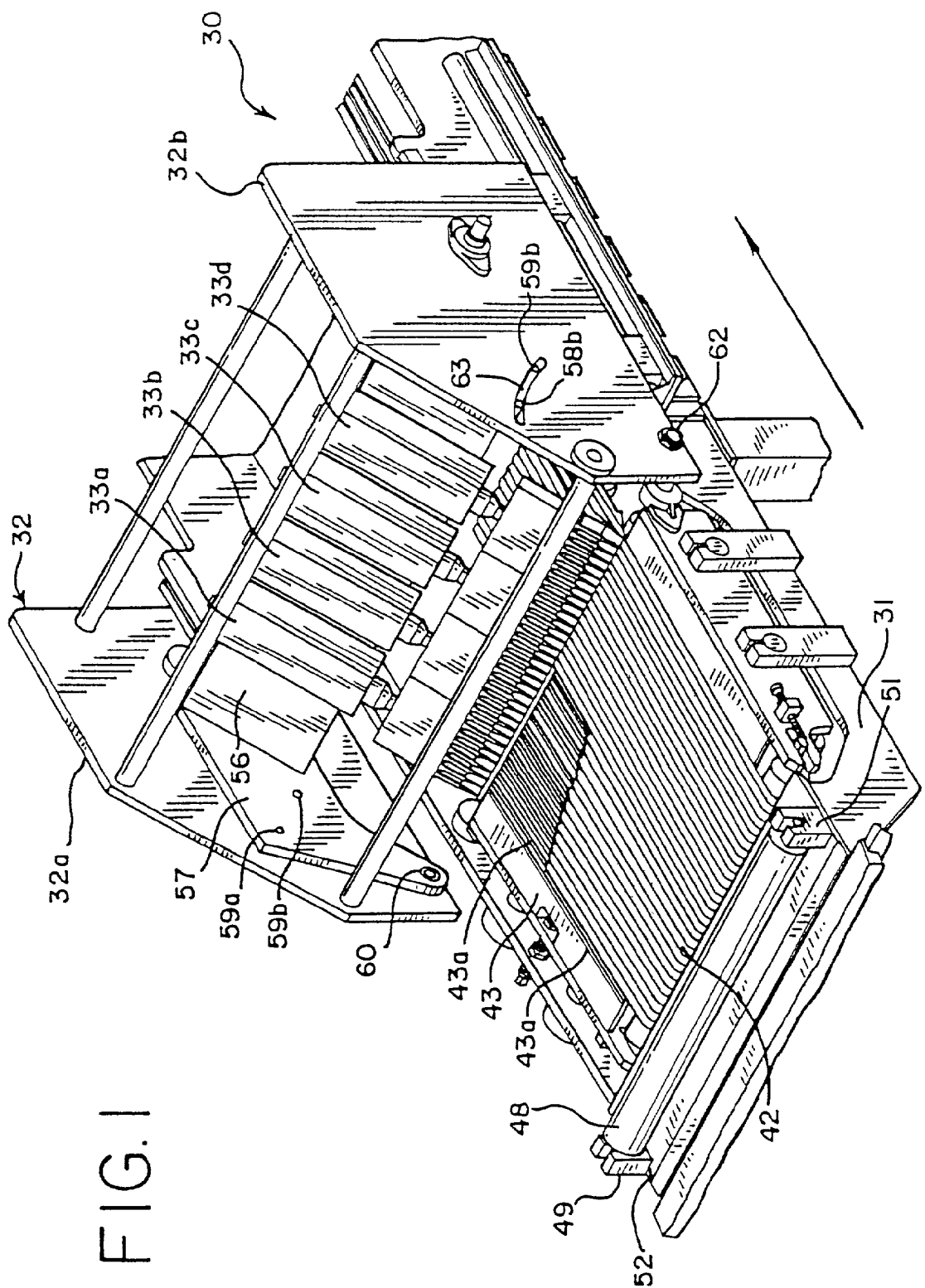
FIG. 1 is a perspective view with portions broken away, showing certain important elements of a preferred form of apparatus of a present invention for slitting a continuous length of confectionery feedstock.

The apparatus of the present invention is capable of being embodied in a number of forms, and the inventive process includes several methods all falling within the general ambit of the inventive concept.

Accordingly, by way of example only and not by way of limitation, a description will be given of several different forms of apparatus, each capable of practicing the invention and each having individual components capable of being varied in constructional details and arrangements. Illustrative methods, the steps of which may also be modified or altered somewhat in use, are also described herein.

Referring to the drawings, FIGS. 1–5 show the invention embodied in a confectionery product slitting apparatus generally designated by the reference numeral 30 which includes a lower support frame portion 31, an upper frame portion 32 and an array of ultrasonic stacks or drive assemblies 33a–33d which, in the illustrated embodiment, are of identical construction. As best shown in FIGS. 3 and 4, each stack or drive assembly comprises a power supply (not shown) that furnishes electrical energy through a radio frequency cable to a converter 34a wherein high frequency (typically 20 kHz) electrical energy is transduced into vibratory mechanical motion, preferably by a plurality of piezoelectric transducer devices. The output of the converter 34a is amplified, in a booster assembly 35a, and the output end face of the booster 35a is secured by suitable means such as a bolt to the upper surface of ultrasonic horn 36a. Preferably, in this assembly, the components are configured and arranged so that an anti-node or near-maximum mechanical vibration amplitude is provided at the cutting edge 38a of the blade 37a. Amplitudes of vibration may vary depending on the power and the tool design, however, with frequencies from about 20 kHz to about 40 kHz, the amplitudes of the cutting edges that have been useful will range generally from about 10 to about 50 microns. It is possible, however, that vibration amplitudes greater than these could be useful in the practice of the present invention.

In this illustrated embodiment blades 37a are secured to the horn 36a by a suitable means such as, for example, brazing or electron beam welding. Preferably, at the lower portion of each blade is tapered and the corners 39a and 40a rounded to eliminate fracturing or cracking during operation.

As best shown in FIGS. 1 and 2, lower support frame portion 31 has a plurality of elastomeric slitter in-feed belts 42 which overlie a support surface 43 having a plurality of longitudinal channels 43a. As best shown in FIG. 5A, channels 43a are separated by ridges 43b that serve as anvils for cutting edges 38a of blades 37a. The elastomeric slitter infeed belts 42 are suitably guided and driven by a plurality of pulleys 44, 45, 46 and 47 in a known manner. In this regard, it will be appreciated that while elastomeric slitter infeed belts 42 are, in the illustrated embodiment, shown as a plurality of separate belts spaced apart a distance sufficient to receive therebetween the cutting edge portions of the ultra-sonically vibrating blades 37, the plurality of individual belts can be replaced by a continuous single belt.

A continuous moving slab of confectionery product is supplied to the slitting apparatus 30 in a known manner. This slab can be in the form of a single layer or a composite slab formed by successively depositing a mass of confectionery material such as nougat from a chill roll (not shown) onto a conveyor (not shown) and advancing that deposited material toward a station wherein a second confectionery material such as caramel is supplied from another chill roll to form a composite slab. The slab is then passed through a cooling tunnel (not shown) and conveyed therefrom to a hold down roller 48 which is supported by a pair of brackets 49 and 51 in a known manner. In the illustrated embodiment, the slab of confectionery material is supplied to the location of the hold down roller 48 by a conveyor of any suitable type such as, for example, a steel belt conveyor which deposits the slab onto a transfer plate 52. A steel belt conveyor affords the advantage of providing cooling at the bottom of the slab thereby facilitating release of the composite slab onto the transfer plate 52.

In accordance with an important aspect of the present invention, the cutting edges of the blades 37 are selectively positionable so that they collectively provide a common cutting angle and spacing with respect to the slab of confectionery material being supplied thereto. This can, at least in part, be accompanied by mounting the individual ultrasonic stacks 33a–33d on a carrier plate 56 that is selectively adjustable for height and angle. Additionally and/or alternatively, provisions can be made for separately adjusting the elevation and/or angle of each of the individual stacks. Regulation of these adjustments can be provided by known servo systems such as, for example, linear or rotary servos which can be electrically, hydraulically or pneumatically controlled.

If desired, the array of individual ultrasonic stacks 33a–33d can be adjusted for height and angle as illustratively shown in FIG. 2. As shown, the ultrasonic stacks are supported on the carrier plate 56 which, in turn, is operatively mounted to a rack and pinion adjustment system that includes an upper geared rack 53, a lower geared rack 54 and a pinion gear 55. The carrier plate 56 which is, in turn, fixed to a pivotally mounted stack positioning plate 57 secured to the inside surface of left side plate 32a of upper frame portion 32 and a like stack positioning plate on the inside surface of right side plate 32b of upper frame portion 32. As shown, stack positioning plate 57 includes a pair of pins 58a and 59a and the stack positioning plate (not shown) which is secured to the inside surface of right side plate 32b includes like pins 58b and 59b which are respectively received in arcuate slots 61 and 63 in side plates 32a and 32b. The ultrasonic stack positioning plate 57 as shown in FIG. 1, is pivotally fixed to upper frame support plate 32 by a pivot pin 60. Correspondingly, the ultrasonic stack positioning plate mounted to the inside surface of upper frame support plate 32b is pivotally mounted thereto by means of a pivot pin 62.

Horizontal adjustment of the entire assembly is provided by a pair of gears 64 and 66 which ride on a geared rack 65 as shown in FIG. 2. In particular, when gear 66 is in the position illustrated in FIG. 2, the assembly is locked. As shown, gear 64 is mounted on an adjustment shaft 67. Accordingly, when gear 66 is rotated into a position wherein it overlies gear 64, the assembly can be moved by rotating adjustment shaft 67 which, in turn, moves the assembly forward or back along the rack 65 as desired.

Figure 6:
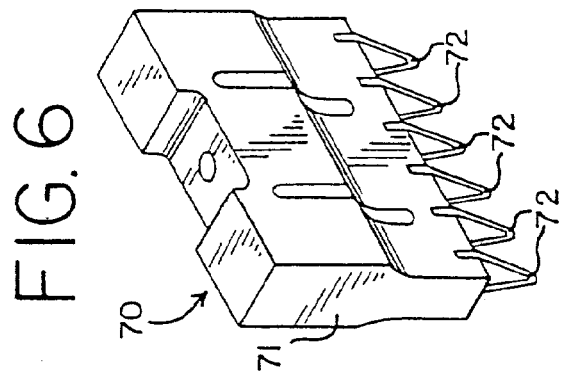
FIG. 6 is a perspective view of an ultrasonically energized slitter horn used in the apparatus and method of the present invention.
Figure 7:
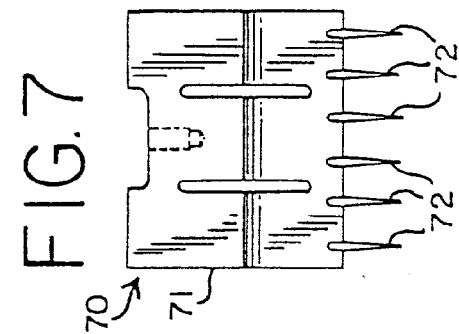
FIG. 7 is a front view of the slitter horn shown in FIG. 6.
Figure 8:
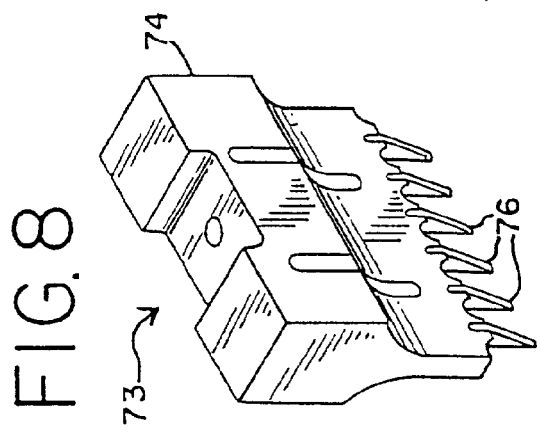
FIG. 8 is a perspective view of another embodiment of an ultrasonically energized slitter horn used in the apparatus and method of the present invention.
Figure 9:
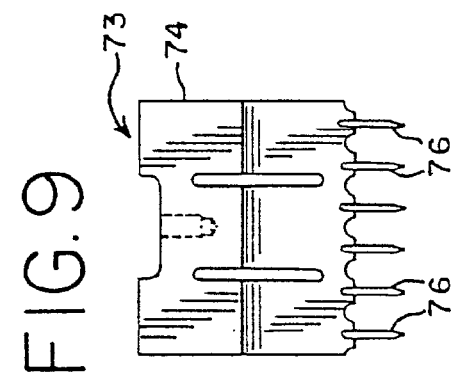
FIG. 9 is a front view of the slitter horn shown in FIG. 8.

FIGS. 6–13 illustrate ultrasonic slitter horns of various constructions and configurations which can be used in the practice of the present invention. Referring to FIGS. 6 and 7, a composite slitting tool 70 which includes a half wave, low gain slitting horn which is adapted to be ultrasonically vibrated at a specific frequency depending on the dimensions of the horn which typically could be in the range of from about 20 kHz to about 40 kHz. As shown, the composite horn includes an ultrasonic horn portion 71 and a plurality of symmetrically V-shaped double edged blades 72 which are secured to the horn portion by any suitable means such as, for example, brazing or electron beam welding. Correspondingly, composite horn 73 shown in FIGS. 8 and 9 is a half wave, high gain slitter horn which includes a horn portion 74 and a plurality of double edge V-shaped blades 76 secured to the horn portion in a similar fashion and is likewise adapted to be ultrasonically vibrated. In both of these embodiments, the blades are non-resonating, that is they vibrate in an axial direction by reason of the fact that they are attached to the face of the vibrating horn and there is no nodal point along the blades themselves. Since the embodiment shown in FIGS. 6 and 7 is a so-called low gain horn, the blades thereof are vibrated at a lower amplitude than that achieved with the embodiment of FIGS. 8 and 9 which is a so-called high gain horn which causes the blades to be vibrated at a higher output amplitude.

FIGS. 10–13 illustrate two additional embodiments of slitter horns useful in the practice of the present invention. Both of these embodiments are, in the illustrated embodiment, depicted as being of integral or unitary construction. It will be appreciated, however, that the blades thereof can be separately formed and secured to the body of the mother horn in a composite fashion by suitable means such as brazing or electron beam welding. Both of these embodiments can be characterized as full wave, high gain horns with the embodiment of FIGS. 10 and 11 being particularly suited for vibrating at a specific ultrasonic frequency of approximately 40 kHz and the embodiment of FIGS. 12 and 13 being particularly suitable for operating it at a specific ultrasonic frequency of approximately 20 kHz. In both of these embodiments, the cutting edges of the blades preferably are at the anti-nodal portion of slitter horn at which near maximum axial vibration is achieved.

Figure 10:
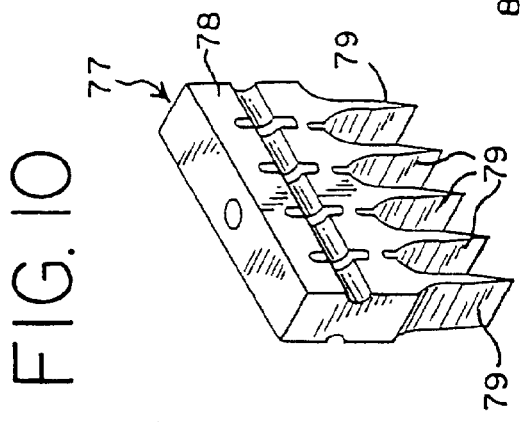
FIG. 10 is a perspective view of another embodiment of an ultrasonically energized slitter horn used in the apparatus and method of the present invention.
Figure 11:
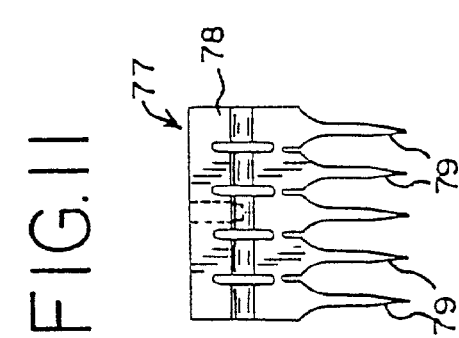
FIG. 11 is a front view of the slitter horn shown in FIG. 10.
Figure 12:
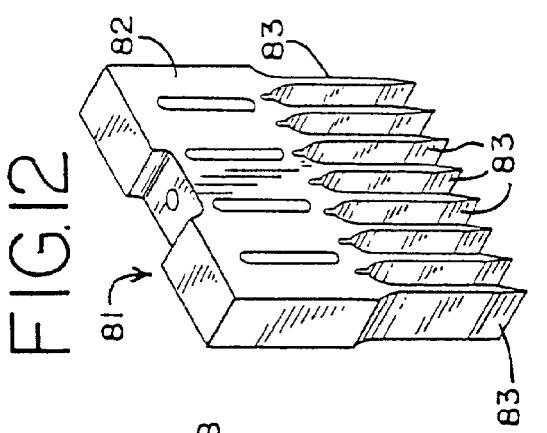
FIG. 12 is a perspective view of another embodiment of an ultrasonically energized slitter horn used in the apparatus and method of the present invention.
Figure 13:
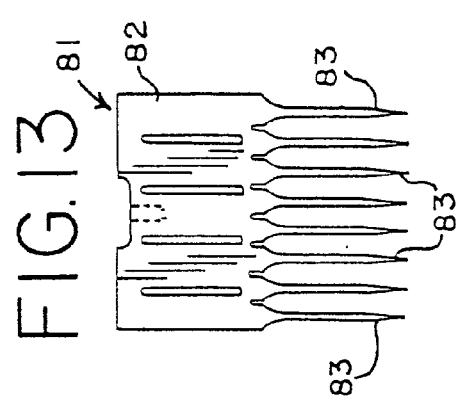
FIG. 13 is a front view of the slitter horn shown in FIG. 12.

Referring to FIGS. 10 and 11, the slitter horn 77 includes a main body portion 78 and a plurality of blades 79 integrally formed therewith. Correspondingly, the embodiment of FIGS. 12 and 13 illustrate a slitter horn 81 having a main body portion 82 and a plurality of blades 83. As will be noted, the blades 79 of the embodiment of FIGS. 10 and 11 and the blades 83 of FIGS. 12 and 13 have respective cutting edges which are similar in configuration to the cutting edge 38a shown in FIG. 4. As was the case with that embodiment, the lower portion of each of the blades 79 and 83 is tapered and the respective corners thereof are rounded to eliminate fracturing or cracking during operation. Also, as will be appreciated, since the cutting edges of the blades of the FIGS. 10–13 embodiments are straight (i.e. not V-shaped) the vibrate at uniform amplitude of vibration along their entire working surfaces.

While the slitter horn/blade assemblies of all of these embodiments can be composed of any suitable metal, it is preferable that they be formed of titanium alloys. The mechanical properties of these alloys and their compatibility with food products combined with their desirable acoustic properties render them highly suitable for use in the present invention. If desired, the blades themselves can be provided with a ceramic coating, a ceramic/Teflon coating, a titanium nitride coating or other suitable coating to enhance their operation.

In accordance with an important aspect of the present invention, slitter horns of FIGS. 6–9 are mounted so that they are generally perpendicular to the plane of the slab of confectionery material supplied thereto while the blades of the slitter horns of FIGS. 10–13 are preferably oriented with respect to the horizontal plane of the slab of confectionery material so that the longitudinal axis of each such blade is at an acute angle of from about 40° to about 60° with angles of approximately 45° being particularly preferred. Variations from and within these ranges can be made depending upon the thickness, composition and physical properties of the slab of confectionery material.

Referring to FIGS. 14 and 14A, reference numeral 85 illustrates one form of slitter/slab contacting arrangement which is suitable in the practice of the present invention. As shown, this arrangement includes a pulley 86 and flexible steel conveyor belt 87 on which a composite slab of confectionery material 88 is carried for contact with the cutting edge 38a of ultrasonically vibrating blade 37a. As best shown in FIG. 14A, the cutting edge 38a and its corner 40a are positioned so that they are in air gap 87 so that they penetrate the full thickness of slab 88 but are not in contact with the top surface of belt 87.

The slit product discharged on the downstream side of blade 38a comes in contact with a combination doctor blade-strip separation device 90 for peeling off and discharge of adjacent strips 88a and 88b onto alternate up ramps 90a and horizontal ramps 90b, respectively. The thus formed slits 88a and 88b are then respectively transported for further processing by conveyor belts 91 and 92. As shown, conveyor belt 94 is driven around an inner pulley 93 and conveyor belt 92 around an outer pulley 94. Pulleys 93 and 94 co-rotate with each other and are powered by a suitable drive system which is not shown but the construction of which will be apparent to those skilled in this art.

Figure 18:
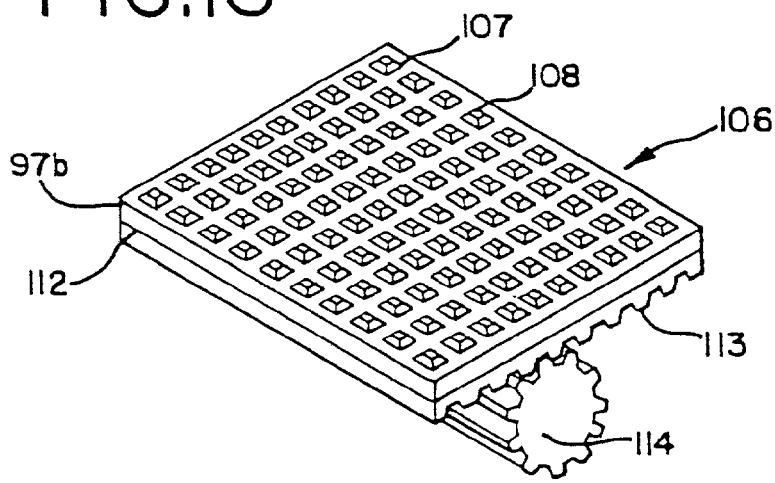
FIG. 18 is a fragmentary perspective view of one embodiment of slitter feed belt for supplying a slab of confectionery feed stock to an ultrasonically energized slitter tool in accordance with the present invention; and, FIG. 19 is a fragmentary perspective view of another embodiment of slitter feed belt for supplying a slab of confectionery feed stock to an ultrasonically energized slitter tool in the apparatus of FIGS. 1–5.
Figure 19:
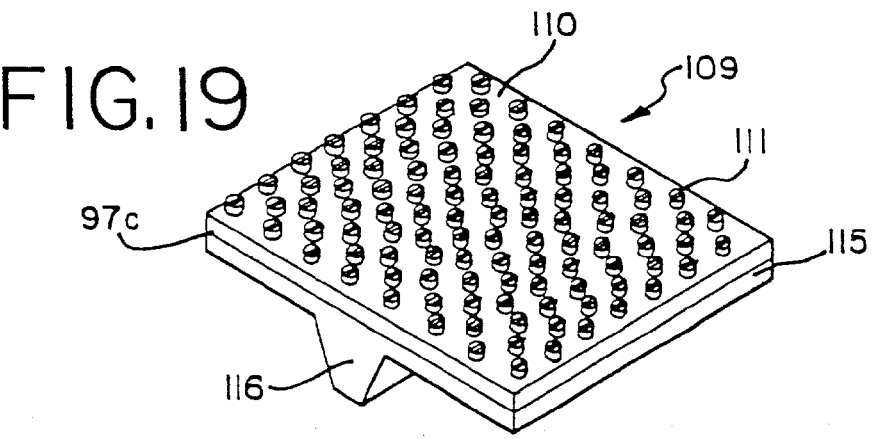

An alternate embodiment of slitter/slab contacting arrangement is designated in FIG. 15 by the reference numeral 96. In this arrangement, a slitter infeed belt 97 is composed of a suitable flexible elastomeric material. As best shown in FIGS. 18 and 19, the profile of belt 97 preferably is embossed to ensure adequate grip with the composite slab 88 to feed to same through and past the cutting edge 38a of ultrasonically vibrating slitter blade 37a without the slab and slitted strips buckling or flaring. Belt 97 is driven around a pulley 98 which, if desired, can be powered in a known manner. If desired, a so-called dead plate 97a can be located on the underside of belt 97 adjacent to pulley 98 directly below cutting edge 38a of blade 37a. As more fully shown in FIG. 17, adjacent strips of confectionery products are discharged onto a strip separation device 100 which includes alternate inclined and horizontal ramps 101 and 102 for direct discharge onto conveyors 91 and 92 and further processing of the thus-formed strips to provide a desired confectionery product.

A further embodiment of slitter/slab contacting arrangement is depicted by the reference number 103 which includes an infeed conveyor 97 and rotary anvil 99. As shown, the composite slab 88 of confectionery product is discharged directly into the cutting edge 38a of slitter blade 37a and the strips formed thereby are then discharged onto separation device 100 for further processing as noted above. The portions of the surface of rotary anvil 99 which comes in contact with the corners of the blades 37a are composed of a suitable material to avoid damage to the blade while the remaining portions of that surface can be suitably textured to maintain adequate grip with the bottom of the slab.

Figure 17:
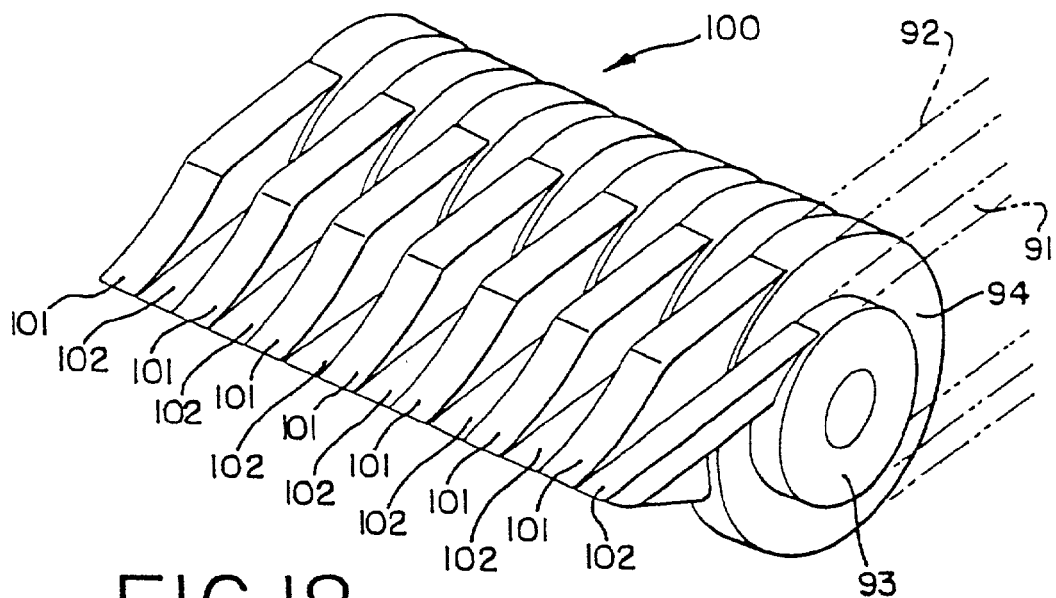
FIG. 17 is a fragmentary perspective view illustrating a strip separation device used in the present invention.

The separation device designated by the reference numeral 100 of FIGS. 15 and 16, shown in greater detail in FIG. 17, includes a plurality of horizontal ramps 101 which are spaced between inclined ramps 102 so that alternate strips of slit confectionery product will be discharged onto conveyors 91 and 92. In this manner, the dimensional spacing between the adjacent strips is increased immediately after the formation thereof in the slitting station thereby preventing their being re-adhered to each other during further processing.

FIGS. 18 and 19 respectively illustrate two embodiments of elastomeric embossed slitter infeed belt upper layers 97b and 97c which can be utilized for the belt 97 of the FIGS. 15 and 16 slitter systems. As shown, the embodiment of FIG. 18 is designated by the reference numeral 106 and includes a generally planar base surface 107 and a plurality of uniformly spaced generally rectangular projections 108 upwardly extending therefrom. Correspondingly, the embodiment of FIG. 19 is designated by the reference numeral 109 and includes a generally planar base surface 110 and a plurality of staggered generally circular upwardly extending projections 111. The height of projections 108 and 111 are such as to raise the slab a sufficient height from the base surfaces 107 and 110, respectively, to permit full penetration of the slab by the cutting edges of the blades without scoring or otherwise damaging the belt.

As shown in the FIG. 18 embodiment, the elastomeric belt 97b is carried on a flexible support base having a grooved or geared bottom surface 113 for cooperation with a timing gear 114. In the FIG. 19 embodiment, the elastomeric belt 97c is carried on a flexible support base 115 having a V-shaped rib which is adapted to be received in the channels 43a of support 35 surface 43 (FIGS. 5 and 5A).

It will thus be seen that the present invention provides several methods and apparatus for slitting slabs of confectionery products and that representative embodiments of this invention have been described by way of example. It will be appreciated that variations to these described forms of apparatus and method will occur to those skilled in the art and that such variations and changes may be made to the method and apparatus features of this invention without departing from this invention or the scope of the appended claims.

What is claimed is:

1. A method of forming individual strips of edible material, said method including the steps of:
   providing an ultrasonic slitting tool, having at least a pair of cutting edges, said cutting edges being spaced apart a given distance equal to the width of a strip to be formed therewith; and
   contacting an edible material with said ultrasonic slitting tool to form at least one strip of edible material, wherein the cutting edges of said slitting tool are oriented at an approximate angle 44 degrees to 60 degrees with respect to the horizontal plane of said edible material.

2. The method of claim 1 wherein said slitting tool includes at least three cutting edges which form at least a pair of adjacent strips of edible material, said method further comprising the step of increasing the dimensional spacing between said adjacent strips immediately after the formation thereof in said slitting station.

3. The method of claim, 1 wherein said slitting tool includes a horn having integrally formed blades and said cutting edges are formed on said blades.

4. The method of claim 3 wherein the said cutting edges of said blades are at said anti-node portion of said tool.

5. The method of claim 1 wherein said slitting tool vibrates in an axial direction upon the energization thereof.

6. The method of claim 1 wherein said slitting tool includes a horn having separately formed blades which are fixed to said horn and said cutting edges are formed on said blades.

7. An apparatus for slitting an edible material, said apparatus comprising:
an input conveyor for supplying edible material; and
an ultrasonic slitting tool which includes an ultrasonic horn having at least a pair of parallel cutting edges spaced apart a distance equal to the width of a strip of edible material to be formed, said cutting edges being positioned to contact said edible material as said edible material is supplied to said ultrasonic slitting tool by said input conveyor, wherein each of said cutting edges is oriented at an approximate angle of 40 degrees to 60 degrees with respect to the plane of said input conveyor.

8. The apparatus of claim 7 wherein said horn and said at least a pair of parallel cutting edges are integrally formed.

9. The apparatus of claim 7 wherein said at least a pair of cutting edges are formed in separate blades which are fixed to said horn.

10. The apparatus of claim 7 wherein said input conveyor comprises a plurality of separate conveyor strips which are spaced apart at a sufficient distance to permit said cutting edges to be received therebetween.

11. The apparatus of claim 7 wherein said slitting tool includes at least three cutting edges which are spaced and positioned to form at least a pair of adjacent strips of edible material, said apparatus further comprising means for increasing the dimensional spacing between adjacent strips immediately after the formation thereof in said slitting station.

12. The apparatus of claim 7 wherein a plurality of said cutting edges are included in each of a plurality of ganged ultrasonic stacks.

13. The apparatus of claim 12 wherein each of said cutting edges is formed on a slitter blade which is oriented at an acute angle of about 45 degrees with respect to the plane of said input conveyor.

14. A system for ultrasonically slitting edible material including:
an ultrasonic slitting tool for slitting edible material, said ultrasonic slitting tool having a plurality of cutting edges, each of said cutting edges oriented at an angle other than perpendicular with respect to said edible material.

15. The system of claim 14 wherein thy amplitude of vibration over each of said cutting edges is uniform.

16. A system for ultrasonically slitting edible material including:
an ultrasonic slitting tool having a plurality of cutting edges, wherein the amplitude of vibration over a plurality of said cutting edges is uniform.

17. The system of claim 16 wherein each of said cutting edges is oriented at an approximate angle between 40 degrees and 60 degrees with respect to a horizontal plane.

18. A method of ultrasonically slitting edible material including the steps of:
orienting a plurality of cutting edges of a slitting tool at an angle other than perpendicular with respect to an input conveyor supporting edible material; and
slitting said edible material using said slitting tool.

19. A method of ultrasonically slitting edible material using an ultrasonic slitting tool having a plurality of cutting edges, said method including the step of:
uniformly applying an amplitude of vibration over said cutting edges; and
slitting said edible material with said ultrasonic slitting tool wherein the amplitude of vibration over said plurality of said cutting edges uniform.

20. A system for ultrasonic processing of edible material, said system including:
a plurality of ultrasonically activated horns; and
a conveyor supplying a slab of edible material to said plurality of ultrasonically activated horns to process said edible material,
wherein at least one of said horns is oriented at an angle of about 20 degrees to about 70 degrees with respect to the horizontal plane of said conveyor.

21. A system for ultrasonic processing of edible material, said System including:
a plurality of ultrasonically activated blades; and
a conveyor supplying a slab of edible material to said plurality of ultrasonically activated blades to process said edible material,
wherein at least one of said blades is oriented at an angle of about 20 degrees to about 70 degrees with respect to the horizontal plane of said conveyor.

22. A method of ultrasonically processing edible material, said method including the steps of:
providing a plurality of ultrasonically activated horns; and
supplying a slab of edible material on a conveyor to said plurality of ultrasonically activated horns to process said edible material,
wherein at least one of said horns is oriented at an angle of about 20 degrees to about 70 degrees with respect to the horizontal plans of said conveyor.

23. A method of ultrasonically processing edible material, said method including the steps of:
providing a plurality of ultrasonically activated blades; and
supplying a slab of edible material on a conveyor to said plurality of ultrasonically activated blades to process said edible material,
wherein at least one of said blades is oriented at an angle of about 20 degrees to about 70 degrees with respect to the horizontal plane of said conveyor.

* * * * *

UNITED STATES PATENT AND TRADEMARK OFFICE
CERTIFICATE OF CORRECTION

PATENT NO. : 7,141,259 B2
APPLICATION NO. : 10/001494
DATED : November 28, 2006
INVENTOR(S) : Roberto A. Capodieci It is certified that error appears in the above-identified patent and that said Letters Patent is hereby corrected as shown below:

Column 8, line 48, delete the number "44" and insert the number --40--.

Signed and Sealed this

First Day of June, 2010

David J. Kappos
*Director of the United States Patent and Trademark Office*